United States Patent [19]
Davis et al.

[11] Patent Number: 5,935,551
[45] Date of Patent: Aug. 10, 1999

[54] SYNTHESIS OF ZEOLITES BY HYDROTHERMAL REACTION OF ZEOLITE P1

[75] Inventors: Mark E. Davis; Shervin Khodabandeh, both of Pasadena, Calif.

[73] Assignee: California Institute of Technology, Pasadena, Calif.

[21] Appl. No.: 08/836,966

[22] PCT Filed: Nov. 12, 1996

[86] PCT No.: PCT/US96/17921

§ 371 Date: Jul. 29, 1997

§ 102(e) Date: Jul. 29, 1997

[87] PCT Pub. No.: WO97/18163

PCT Pub. Date: May 22, 1997

Related U.S. Application Data

[60] Provisional application No. 60/006,778, Nov. 15, 1995.

[51] Int. Cl.$^6$ .......................... C01B 39/26; C01B 39/28; C01B 39/46
[52] U.S. Cl. .......................... 423/700; 423/709; 423/712; 423/DIG. 25
[58] Field of Search .................................... 423/700, 709, 423/712, DIG. 25, 328.2, 330.1, 331, 332, 333

[56] References Cited

U.S. PATENT DOCUMENTS

| | | |
|---|---|---|
| 3,008,803 | 11/1961 | Milton . |
| 3,733,390 | 5/1973 | Robson . |
| 4,401,633 | 8/1983 | Sun ......................................... 423/712 |
| 4,496,528 | 1/1985 | Bourgogne et al. .................... 423/700 |
| 4,503,024 | 3/1985 | Bourgogne et al. .................... 423/709 |
| 4,980,323 | 12/1990 | Bedard et al. ........................ 423/328.1 |
| 5,139,760 | 8/1992 | Ogawa et al. . |
| 5,225,179 | 7/1993 | Zones et al. ............................. 423/709 |
| 5,340,563 | 8/1994 | Zones et al. .......................... 423/328.2 |
| 5,374,370 | 12/1994 | Brown et al. . |
| 5,599,520 | 2/1997 | Garces et al. ........................... 423/700 |

FOREIGN PATENT DOCUMENTS

| | | |
|---|---|---|
| 775049 | 11/1980 | U.S.S.R. . |
| 1049425 | 10/1983 | U.S.S.R. . |
| 1230995 | 5/1986 | U.S.S.R. . |
| 1353729 | 11/1987 | U.S.S.R. . |
| 94/26662 | 11/1994 | WIPO . |

OTHER PUBLICATIONS

Barrer et al., "Hydrothermal Chemistry of Silicates. Part XIII, Synthetic Barium Aluminosilicates," J. Chem. Soc., 1964, pp. 2296–2305 No Month.

Barrer, "Some Researches in Silicates: Mineral Synthesis and Metamorphoses," Trans. Brit. Ceramic Soc., vol. 56, pp. 155–184, 1957 No Month.

Hakansson et al., "Structure of High–Silica Variety of Zeolite Na–P," Acta Cryst., C46, pp. 1363–1364, 1990.

Meier et al., "Atlas of Zeolite Structure Types", 1992, pp. 66, 67, 90, 91, 100, 101, 106, 107, 110, 111, 164, 165, 189 & 194. (No Month).

*Primary Examiner*—Mark L. Bell
*Assistant Examiner*—David Sample
*Attorney, Agent, or Firm*—Limbach & Limbach LLP

[57] ABSTRACT

New synthetic zeolites incorporating alkaline earth elements and routes for preparing those zeolites by hydrothermal alteration of zeolite P1 are disclosed. New methods for producing P1 zeolites are also identified. Synthetic heulandite, brewsterite, epistilbite and harmotome, among other zeolites can be prepared.

57 Claims, No Drawings

SYNTHESIS OF ZEOLITES BY HYDROTHERMAL REACTION OF ZEOLITE P1

This application claims priority to U.S. provisional application Ser. No. 60/006,778, filed Nov. 15, 1995.

BACKGROUND OF THE INVENTION

1. Field of the Invention

The present invention relates to new synthetic zeolites incorporating alkaline earth cations and routes for preparing those zeolites by hydrothermal alteration of zeolite Pi. New methods for producing P1 zeolites are also identified.

2. Description of the Related Art

Heulandite-type zeolites are the most abundant natural zeolites and are frequently found in volcanic rocks, altered volcanic tuff deposits and deep-sea sediments.

The topology of heulandite-type zeolites is characterized by a two-dimensional void structure consisting of pores composed of 8 tetrahedral atoms in the [100] direction that intersect pores composed of 10 tetrahedral atoms in the [001] direction. Heulandite can be distinguished from clinoptilolite on the basis of chemical composition. If the Si/Al ratio $\leq 4$ and the cation content is such that Ca>(Na+K), then the zeolite is referred to as heulandite; otherwise, it is called clinoptilolite. Although heulandite and clinoptilolite have the same maximum framework topology, the natural conditions under which they are formed, as well as their physical and thermal properties are markedly different.

Natural heulandites and clinoptilolites have found applications in ion-exchange and separation processes. However, their use as catalysts is limited by the presence of relatively large amounts (on the order of 0.5 weight %) of impurities such as iron and titanium. Such impurities are commonly found in natural samples as oxides and hydroxides both in the zeolite framework as other crystalline phases or amorphous tuffs associated with a particular occurrence of the zeolite.

One potential catalytic application of an impurity-free synthetic zeolite with the heulandite topology is that of the isomerization of 1-butene to isobutene as suggested by the recent work of Woo, et al. The development of an efficient catalyst for the production of isobutene could have great industrial implications due to the versatility of isobutene in the manufacture of a number of chemicals particularly that of methyl tert-butyl ether (MTBE) as an octane booster for gasoline.

Heulandite has proven exceedingly difficult to synthesize in the laboratory. To date, there are two published synthesis routes to heulandite. In 1960, Koizumi and Roy reported the synthesis of a heulandite-type zeolite from the composition $CaO.Al_2O_3.7SiO_2.5H_2O$ at temperatures between 250° C. and 360° C. and a pressure range of 15000 to 37000 psi. In 1981, Wirsching obtained heulandite by hydrothermal alteration of rhyolitic glass under the action of $CaCl_2$ solutions at temperatures of 200° C. to 250° C. and reaction times of around 80 days. Additionally, some syntheses for clinoptilolite zeolites have been reported.

Similarly, other zeolites are either difficult to produce, or have not been produced synthetically at all. For example, brewsterite is a naturally occurring, though rare, zeolite, for which a synthetic preparation has not previously been reported. It has a pore system described by intersecting channels consisting of pores composed of eight tetrahedral atoms in the [100] and [001] directions.

Harmotome is another rare zeolite of hydrothermal origin which has the phillipsite (PHI) topology and is characterized by three dimensional channels consisting of pores composed of eight tetrahedral atoms. The dominant cation in the zeolite is Ba.

Epistilbite is another rare zeolite of hydrothermal origin, which has previously been produced by hydrothermal treatment of rhyolytic glass at 250° C. and from powdered $SiO_2$ glass at 250° C. It has a structure characterized by intersecting channels composed of eight and ten tetrahedral atoms.

Since these naturally occurring materials are rare, but so potentially useful, it would be advantageous to identify less rigorous and therefore less expensive routes for the production of greater quantities of these materials. Particularly of interest would be routes which would produce materials with few or no impurities.

SUMMARY OF THE INVENTION

The present invention provides a synthetic route to the formation of zeolites using zeolite P1 as a starting material. In a first embodiment, the method uses at least one alkaline earth cation in a hydrothermal alteration of zeolite P1. In another form of the method of the invention the method uses at least one alkali metal cation in a hydrothermal alteration of zeolite P1.

The new routes significantly reduce the time necessary to produce the end product, and in some cases, permit the synthesis of materials for which there has been no previously reported synthesis.

The invention further includes new methods for making zeolite P1 in a novel form particularly suited for the method of the invention, i.e. zeolite P1 having a ratio of Si/Al of 3 or more.

DESCRIPTION OF THE INVENTION

The preferred embodiments of the invention are now described, in which a general method for the production of alkaline earth cation-containing zeolites from zeolite P1 is used. New methods of making zeolite P1 have been developed as well.

The invention will be better understood by reference to the following definitions. Since naturally occurring zeolites have different names according to their structures and compositions, clarity is needed when referring to zeolites.

By "zeolites" we mean microporous crystalline aluminosilicates as is commonly know throughout the literature. We refer to zeolites by the names recognized as indicating their framework topologies and their chemical compositions. The relevant framework topologies are defined in the Atlas of Zeolite Structure Types, published by Butterworth-Heinemann for the structure commission of the International Zeolite Association (IZA), third edition (Meier and Olsen editors), which is incorporated herein by reference.

Making Zeolite P1

We have found that a particular class of P1 zeolites is necessary for the method of the P1 to zeolite product of the invention. For this method to work it is crucial that the Si/Al ratio of the starting P1 zeolite be equal to or greater than about 3. Therefore, a substantial portion of our work was devoted to the development of synthesis procedures in order to obtain a P1 zeolite with a suitable Si/Al ratio. (With respect to references herein to zeolite P1, we mean a zeolite of the Gismondine topology (GIS)).

In order to accomplish this, three new routes for making zeolite P1 have been identified. The first of these methods includes the step of heating an aqueous solution containing perlite and an alkali metal cation, typically sodium, at a basic pH to form a P1 zeolite having a silicon to aluminum ratio of about 3 or greater. This method provides ease of use, however, it has the disadvantage that perlite, as a naturally occurring material, will generally include impurities which may be undesirable for some uses of a zeolite end product.

EXAMPLE 1

Synthesis of Zeolite P1

Ten ml of a solution of 0.8 M $Na_2CO_3$ was added to 0.50 gram of perlite (PA-1000 from Johns-Manville) in a Teflon-lined, 23-ml autoclave and heated for 11 days at 120° C. The solid was then filtered and washed and was identified as Na-P1 with Si/Al=3.2 obtained from $^{29}$Si NMR and elemental analysis. X-ray powder diffraction pattern of this solid confirmed this analysis.

Higher temperatures can be used to obtain faster reaction times. In another example, twenty ml of a solution of 0.8 M $Na_2CO_3$ was added to 0.78 gram of perlite (PA-1000 from Johns-Manville) in a Teflon-lined, 45-ml autoclave and heated for 2 hours at 240° C. The solid was then filtered and washed and is identified as Na-P1 its x-ray diffraction pattern.

A second method of zeolite P1 formation includes the steps of forming a sodium aluminosilicate gel from an aqueous mixture including silica and alumina at a basic pH, drying the gel to form a dried solid, the dried solid having a composition expressed by the formula in terms of molar ratios of $$1\text{--}4\ Na_2O:Al_2O_3:9\text{--}10\ SiO_2$$

(and may include water) and mixing the dried solid (referred to as gel E) with an aqueous solution of $Na_2CO_3$, and heating to form a P1 zeolite having a silicon to aluminum ratio of about 3 or greater.

This second route through gel-E has the advantage of producing a zeolite P1 which is relatively free from contaminants.

EXAMPLE 2

Alternative Synthesis of P1

Two grams of sodium aluminate (from EM) were dissolved in 60 ml distilled water. Four grams of a 50% w/w solution of NaOH were added to this solution. To this mixture was slowly added 5.20 grams of Cab-O-Sil (grade M5) silica with continuous stirring. The resulting gel was stirred at room temperature for 48 hours after which the stirring was stopped and the gel was allowed to dry at room temperature for one week. This amorphous aluminosilicate gel has a molar composition $Al_2O_3$:9.4 $SiO_2$:3.7 $Na_2O$, and includes some amount of water. Zeolite P1 was obtained by heating a mixture of 0.5 grams of this gel and 10 ml 0.4 M $Na_2CO_3$ at 150° C. for 5 days in a 23-ml, Teflon-lined autoclave. Results were confirmed by X-ray powder diffraction. The following Table I shows results of experiments in which zeolite P1 produced by this gel-E method.

TABLE I

Reactions of aluminosilicate gel-E with sodium carbonate solutions[a].
Molar composition of the complete reaction mixture is x $Na_2O$ : $Al_2O_3$ : 9.4 $SiO_2$ : y $H_2O$

| T(°C.) | time(d) | conc. (M) | $Na_2O$ | $H_2O$ | Results[c] |
|---|---|---|---|---|---|
| 110 | 11 | 0.8 | 43 | 2768 | amorphous |
| 130 | 11 | 0.8 | 24 | 1386 | P1 + ANA (10%) |
| 130 | 11 | 0.8 | 43 | 2768 | P1 + ANA (30%) |
| 130 | 10 | 0.8 | 19.6 | 1100 | P1 (Si/Al = 2.7)[d] |
| 130 | 7 | 0.8 | 19.6 | 1100 | P1 + amorphous |
| 150 | 5 | 0.8 | 17 | 926 | P1 + ANA (5%) |
| 150 | 5 | 0.8 | 11.7 | 558 | P1 + MOR (3%) + ANA (3%) |
| 150 | 2 | 0.8 | 19.6 | 1110 | P1 + amorphous |
| 150 | 2 | 0.4 | 11.7 | 1110 | amorphous + P1 |
| 150 | 5 | 0.4 | 11.7 | 1110 | P1 (Si/Al = 3.0)[d] |
| 150 | 5 | 0.4 | 10.3 | 926 | P1 (Si/Al = 3.0)[e] |
| 150 | 5 | 0.4 | 9.7 | 834 | P1 (Si/Al = 3.2)[e] |

[a]Reactions were carried out using 0.3 to 1.0 g of gel-E and 5 to 15 ml of $Na_2CO_3$ solution. Relative $Na_2O$ concentration was controlled by varying the concentration and/or the solid/solution ratio of the reaction mixture.
[b]Starting concentration of the solution phase.
[c]Final products are given in decreasing order of relative abundance based on XRD, ANA = analcime, MOR = mordenite. For quantification of relative amount of impurities, the characteristic XRD intensities of the phases were compared: (211) for ANA, (200) for MOR and (110) for P1.
[d]Si/Al ratio determined by $^{29}$Si NMR spectroscopy (no extra framework aluminum is detected by $^{27}$Al NMR spectroscopy).
[e]Si/Al ratio determined by $^{29}$Si NMR spectroscopy and elemental analysis (no extra framework aluminum is detected by $^{27}$AL NMR spectroscopy).

A third new method for producing zeolite P1 comprises the steps of forming a gel from an aqueous mixture of $Al(OH)_3$ NaOH and colloidal silica at a basic pH, and heating the gel at about from 110° C. to about 175° C. (preferably about 150° C.) produce said P1 zeolite having a silicon to aluminum ratio of about 3 or greater.

EXAMPLE 3

Alternative Synthesis of P1

An alternate synthesis of P1 with Si/Al≧3 was accomplished by adding 0.40 g aluminum trihydroxide (Reheis, F2000) to a solution containing 2.0 grams of 50% w/w NaOH in 10.5 g water. The Si/Al ratio of the starting mixture was controlled by the addition of the appropriate amount of colloidal silica (Ludox, AS-40). The mixture was stirred at room temperature for 3 hours. The resulting gel was transferred to a Teflon-lined autoclave reactor and heated at 150° C. for 3–5 days. Using this method, P1 with Si/Al=3.0 was synthesized from a starting composition of 5.5 $Na_2O:Al_2O_3$:15.8 $SiO_2$:370 $H_2O$, while P1 with Si/Al=3.2 was made from a starting composition of 5.5 $Na_2O:Al_2O_3$:17.5 $SiO_2$:380$H_2O$.

The following Table II shows the results of experiments in which zeolite P1 was produced by this third method.

TABLE II

Synthesis of P1 from colloidal silica

| Reaction Mixture Composition | | | | | |
|---|---|---|---|---|---|
| $Na_2O$ | $Al_2O_3$ | $SiO_2$ | $H_2O$ | Result | Si:Al |
| 5.5 | 1 | 15.5 | 370 | P1 | 2.9 |
| 5.5 | 1 | 15.9 | 370 | P1 | 3.0 |
| 5.5 | 1 | 16.5 | 370 | P1 | 3.2 |
| 5.5 | 1 | 17.5 | 380 | P1 | 3.3 |

TABLE II-continued

Synthesis of P1 from colloidal silica

| Reaction Mixture Composition | | | | | |
|---|---|---|---|---|---|
| $Na_2O$ | $Al_2O_3$ | $SiO_2$ | $H_2O$ | Result | Si:Al |
| 5.5 | 1 | 20.5 | 390 | amorphous | — |
| 5.5 | 1 | 23.4 | 407 | amorphous | — | syntheses carried out at 150° C. for 3.5 days.

Making Zeolite Products of The Invention

In its broadest form, the new method of the invention includes the steps of forming a mixture of a P1 zeolite in aqueous solution, where the solution includes at least one alkaline earth cation, and heating the mixture to produce a zeolite that is different from P1 but includes the alkaline earth cation.

In this form of the invention, the preferred alkaline earth elements used in the invention are calcium, strontium and barium. The product may contain an alkali metal cation, when such an ion is included in the reaction mixture. When an alkali metal cation is included it will typically be sodium.

The zeolite products produced by the method are new as well. These unique zeolites differ from naturally occurring materials by elimination of contaminating materials, and the incorporation of at least one alkaline earth cation.

Exemplary embodiments of the invention include hydrothermal alteration of zeolite P1 to form zeolites having heulandite, brewsterite, epistilbite and phillipsite topologies.

In the method of the invention, the P1 zeolite used has a silicon to aluminum ratio of greater than about 3. Preferably the silicon to aluminum ratio will be in the range of from about 3.0 to about 3.2.

It may be useful to subject the P1 zeolite starting material, such as with Na-P1, to an exchange reaction in which, e.g., calcium or strontium is exchanged for sodium.

The reaction of the invention can produce zeolite products at moderate reaction temperatures. The lower temperature limit is a practical one: at temperatures of below about 100° C. the reaction will proceed so slowly as to be impractical. Temperatures greater than about 300° C. are likewise not necessary, as lower temperatures result in the formation of pure zeolite products in much faster times than previously reported. Thus, the reaction mixture temperature will be from about 100° C. to about 300° C. Preferably, the mixture will be heated to a temperature in the range of from about 170° C. to about 275° C.

The addition of zeolite seed to the reaction mixture can assist in the formation of the product. We have determined however, that, in general, the zeolite products of the invention can often be made when seed crystals are not used.

Zeolite products according to the invention are formed rapidly, for example, where the reaction mixture is heated for a period of greater than about 1 day. We have achieved very good product quality and quantity with reaction times in the range of about 7 to about 24 days.

1. Synthesis of CIT-3

The product of the new method can have a heulandite topology and a molar composition expressed by the formula in terms of mole ratios

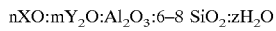
$nXO:mY_2O:Al_2O_3:6-8\ SiO_2:zH_2O$ wherein X is at least one alkaline earth cation selected from the group consisting of Ca and Sr, Y is an alkali metal cation, $0 \leq n \leq 1$, $0 \leq m$, $n > m$, n+m is approximately 1, and $z \leq 0$. The product produced is referred to hereinafter as CIT-3. CIT-3 is a synthetic aluminosilicate zeolite with the (HEU) topology and a Si/Al ratio of less than or equal to 4. Those skilled in the art will recognize that CIT-3 is distinct from clinoptilolite based on its composition.

As indicated, there may be water in the product. Typically, the value of "z" will vary from zero (e.g. when the zeolite is dehydrated) to a maximum value in the hydrous state to fill the void space of the crystalline structure.

By the phrase "n+m is approximately 1," we mean that in a very "clean" crystal the value will be very close to one. However, those skilled in the art will recognize that variations from unity will occur due to inclusion of small amounts of alkaline earth or alkali metal oxides and hydroxides in the void space.

The following are examples of the method according to the invention of making CIT-3 from zeolite P1.

EXAMPLE 4

Conversion of Ca-P1 to CIT-3 at 240° C.

1.00 grams of P1 (synthesized as in Examples 1–3) was ion-exchanged at 80° C. by treatment with 100 ml of a 1.00 N solution of $CaCl_2$ in order to obtain Ca-P1. 0.20 grams of Ca-P1 was added to 10 ml of a solution of 0.01 N $CaCl_2$ and 0.0009 N NaOH (pH=10.95). 0.010 gram (10% by weight) of Ca-exchanged natural clinoptilolite was added as seed. The mixture was heated in a Teflon-lined autoclave at 240° C. for 8 days. After 8 days, the liquid phase was removed by filtration and 10 ml of fresh solution of 0.01 N $CaCl_2$ and 0.0009N NaOH was added. The mixture was placed again in an autoclave and heated at 240° C. for an additional 8 days. The resulting solid was filtered and washed and identified by X-ray powder diffraction as heulandite. The Si/Al ratio of this CIT-3 is 3.6 as obtained from $^{29}Si$ NMR and elemental analysis.

EXAMPLE 5

Conversion of as-made P1 to CIT-3 at 240° C.

0.20 grams of P1 (Si/Al 3.0 to 3.2, synthesized as in any of examples 1–3) was added to 10 ml of a solution of 1.0 N $CaCl_2$ and 0.008 N NaOH (pH=11.05). 0.02 gram (10% by weight) of natural clinoptilolite was added as seed. The mixture was heated in a Teflon-lined autoclave at 240° C. for 16 days. The product was CIT-3 as identified by its X-ray powder diffraction pattern.

EXAMPLE 6

This example was carried out using the experimental procedure of Example 4, except that 5% of natural clinoptilolite was used as seed. The product was CIT-3.

EXAMPLE 7

This example was carried out using the experimental procedure of Example 4, except that as synthesized heulandite was used as seed. The product was CIT-3.

EXAMPLE 8

Conversion of Ca-P1 to CIT-3 at 200° C.

This example was carried out using the experimental procedure of Example 4, except that the mixture was heated at 200° C. for 24 days. The product was CIT-3.

EXAMPLE 9

This example was carried out using the experimental procedure of Example 4, except that the solution phase was 0.1 N $CaCl_2$ and 0.0024 N-NaOH (pH=11.05). The product was CIT-3.

EXAMPLE 10

This example was carried out using the experimental procedure of Example 5, except that 0.20 grams of Ca-P1 was used. The product was heulandite.

EXAMPLE 11

This example, the results of which are shown in Table III, includes a series of tests which further explore the method of making CIT-3 from P1 zeolites:

TABLE III

CIT-3 Synthesis Routes

| P1-type | Si/Al | Cation | Seed* | Results |
|---|---|---|---|---|
| Ca-P1 | 3.0 | $Ca^{2+}$ | heu | CIT-3 (16 d) |
| Ca-P1 | 3.0 | $Ca^{2+}$ | — | EPI (16 d) |
| Ca-P1 | 3.2* | $Ca^{2+}$ | — | EPI (16 d) |
| Sr-P1 | 3.2* | $Sr^{2+}$ | heu | CIT-3 (4 d) |
| Sr-P1 | 3.2* | $Sr^{2+}$ | — | CIT-3 (4 d) |
| Sr-P1 | 3.2* | $Sr^{2+}$ | bre | CIT-3 (4 d) |
| Sr-P1 | 3.0* | $Sr^{2+}$ | heu | Sr-aluminosilicate hydrate |
| Sr-P1 | 3.0 | $Sr^{2+}$ | — | Sr-aluminosilicate hydrate |

*"heu" is heulandite, "bre" is brewsterite
10ml of 1.0 N solution of the cation was used per 0.2 g of P1
Composition: 11 (CaO or SrO) : $Al_2O_3$ : (6.0–6.4) $SiO_2$ : 1000 $H_2O$ As shown in Examples 4, 6, 7, 8, 9 and 10 the concentration of $CaCl_2$ can be in the range of 0.01 N to 1.0 N and the concentration of NaOH can vary from 0.0 N to 0.009 N, provided that the total amounts of sodium and calcium (in the solid phase and the solution phase) are such that calcium is the dominant cation as shown in Table V. The pH can vary from 8 to 12.

TABLE IV

Extent of Conversion of P1 to CIT-3[a]

| Type of P1 | $Ca^{2+}$ Conc. (N) | pH | $(Na/Ca)_{sol.}$[b] | $(Na/Ca)_{sol.}$[c] | CIT-3/P1[d] |
|---|---|---|---|---|---|
| Ca-P1 | 0.01 | 11 | 0.09 | 0.012 | 1.2 |
| Na-P1 | 0.01 | 11 | 0.09 | 6.5 | 0.0 |
| Ca-P1 | 0.10 | 11 | 0.024 | 0.015 | 1.3 |
| Na-P1 | 0.10 | 11 | 0.024 | 0.66 | 0.5 |
| Ca-P1 | 1.00 | 11 | 0.008 | 0.008 | 1.2 |
| Na-P1 | 1.00 | 11 | 0.008 | 0.073 | 1.4 |
| Ca-P1 | 0.01 | 6.7 | 0.0 | 0.0 | 0.5 |
| Ca-P1 | 0.10 | 6.7 | 0.0 | 0.0 | 0.6 |
| Ca-P1 | 1.00 | 6.2 | 0.0 | 0.0 | 0.7 |
| Ca-P1 | 1.00 | 9 | $10^{-6}$ | ~0 | 1.2 |
| Ca-P1 | 1.00 | 10 | $10^{-1}$ | ~0 | 1.2 |

[a]Reactions were carried out at 240° C. using 0.20 g of P1, 10% seeds, 10 ml. of $CaCl_2$ solution as the source of calcium and few drops of concentrated NAOH solution to adjust the pH.
[b]Ratio of the normality of $Na^+$ to $Ca^{2+}$ in the starting solution phase.
[c]Ratio of total sodium content to total calcium content in the complete reaction mixture based on equivalents, i.e., one atom of calcium is regarded as two equivalents.
[d]Ratio of the XRD peak arising from the (020) reflection of CIT-3 to that of the (110) reflection of P1.

Thus far, we have not been able to successfully carry out the conversion of P1 to CIT-3 (as described in the examples below) when the starting P1 phase has a Si/Al<3. Table V below summarizes results for CIT-3 synthesis attempts using various starting phases, e.g., P1 with different Si/Al, etc. The synthesis of CIT-3 at the conditions explored here appears to require a starting P1 phase with Si/Al≧3. When Ca-P1 or Ca-Y with a framework Si/Al<3 are used, no CIT-3 is obtained even with the overall Si/Al ratio is increased by the addition of amorphous silica. A faujasite-type phase with a Si/Al=3.5 was also used as a starting material. No conversion of this phase to CIT-3 or any other phases is discerned after three 8-day cycles. Thus, it appears the P1 with a framework Si/Al≧3 is particularly suitable for the synthesis of the zeolite products of the invention, such as CIT-3.

TABLE V

Effect of the structure and the Si/Al ratio of the starting phase on the synthesis of CIT-3[a]

| Starting Phase | $(Si/Al)_{zeolite}$ | $(Si/Al)_{total}$ | Result[d] |
|---|---|---|---|
| Ca-P1 | 1.0 | 1.0 | P1 |
| Ca-P1 + silica[b] | 1.0 | 3.0, 3.2[a] | P1 + amorphous |
| Ca-P1 | 2.6 | 2.6 | P1 + (ANA) |
| Ca-P1 | 2.7 | 2.7 | P1 + (ANA) |
| Ca-P1 + silica[b] | 2.7 | 3.0, 3.2[c] | P1 + amorphous + (ANA) |
| Ca-P1 | 3.0 | 3.0 | CIT-3 |
| Ca-P1 | 3.2 | 3.2 | CIT-3 |
| Ca-Y | 2.4 | 2.4 | Ca-Y |
| Ca-Y + silica[b] | 2.4 | 3.0, 3.2, 3.5[c] | Ca-Y + amorphous |
| Ca-Y | 2.8 | 2.8 | Ca-Y |
| Ca-Y + silica[b] | 2.8 | 3.0, 3.2, 3.5[c] | Ca-Y + amorphous |
| Ca-Y | 3.5 | 3.5 | Ca-Y |

[a]Reactions were carried out on the starting material with 10% seeds at 240° C. Two reactions were performed for each case; one using 0.1 N $CaCl_2$ (pH = 11) and the other using 1.0 N $CaCl_2$ (pH = 11). The pH was adjusted by the addition of concentrated NaOH solution.
[b]Extra silica was used to increase the bulk Si/Al ratio of the starting material. Source of silica was Syloid-63 or Cab-O-Sil, M5.
[c]The bulk Si/Al ratio, adjusted by the addition of amorphous silica. For each value of the Si/Al ratio, two reactions were performed as described in a.
[d]Results are given after two 8-day cycles, where after each cycle, the solution phase is renewed.

2. Synthesis of CIT-4

Where the product of the invention has a brewsterite topology, the zeolite can have a molar composition expressed by the formula (in terms of mole ratios) of $$nXO:mY_2O:Al_2O_3:5.5-6.5\ SiO_2:zH_2O$$

wherein X is at least one alkaline earth cation selected from the group consisting of Sr and Ca, Y is an alkali metal cation, 0<n≦1, 0≦m, n>m, n+m is approximately 1, z≧0 and wherein the amount of Ca≧0 and the amount of Sr is greater than the amount of Ca. This synthetic zeolite is referred to hereafter as CIT-4.

The following Table VI provides experimental results for the method of making CIT-4.

TABLE VI

Representative Syntheses of CIT-4 from Ca-P1

| Si/Al 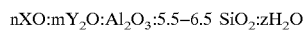 | $[Sr^{2-}]$ (N) | T(°C.) | pH | Seed | Results |
|---|---|---|---|---|---|
| 3.0 | 0.1 | 240 | 11 | 8% | CIT-4 (14 d) |
| 3.0 | 0.1 | 240 | 12 | 8% | CIT-4 (14 d) |
| 3.0 | 1.0 | 240 | 11 | 8% | CIT-4 (14 d) |
| 3.0 | 1.0 | 240 | 12 | 8% | CIT-4 (7 d) |
| 3.0 | 0.1 | 240 | 12 | — | Sr-aluminosilicate hydrate (7–14 d)* |

*–10% $H_2O$; structure collapses upon heating to 500.
0.20 grams of P1 is mixed with 10mls of $SrCl_2$ solution, pH adjusted by addition of $Sr(OH)_2$

EXAMPLE 13

Table VII indicates the effect of starting with differing zeolite P1 compositions:

TABLE VII

Effect of the Starting P1

| P1-type | [Sr$^{2+}$] | After 4 days | After 7 days | After 14 days |
|---------|-------------|--------------|--------------|---------------|
| Ca-P1 | 0.1 | — | P1 + (CIT-4) | CIT-4 |
| Ca-P1 | 1.0 | — | CIT-4 | CIT-4 |
| Na-P1 | 0.1 | — | CIT-4 | CIT-4 + Sr-aluminosilicate |
| Sr-P1 | 0.1 | P1 + CIT-4 | CIT-4 + Sr-aluminosilicate | CIT-4 + Sr-aluminosilicate |

0.20 grams of P1 is mixed with 10mls of SrCl$_2$ solution, pH adjusted by addition of Sr(OH)$_2$ As can be seen, CIT-4 is produced in all cases, however, the rate at which the reaction proceeds is affected by the cation selected.

3. Synthesis of Phillipsite

Where the zeolite produced has a phillipsite topology (e.g. harmotome), the zeolite can have a molar composition expressed by the formula (in terms of mole ratios) of nXO:mY$_2$O:Al$_2$O$_3$:4–6 SiO$_2$:zH$_2$O wherein X is at least one alkaline earth cation selected from the group consisting of Ba and Ca, Y is an alkali metal cation, 0<n≦1, 0≦m, n>m, n+m is approximately 1, z≧0 and wherein Ca≧0 and the amount of Ba is greater than the amount of Ca. This synthetic zeolite is referred to hereafter as phillipsite.

EXAMPLE 14

0.20 grams of Ca-P1 was reacted with 10 mls of a solution of 1.0N BaCl$_2$ and 0.001N Ba(OH)$_2$ for seven days at 240° C. Phillipsite was produced.

4. Synthesis of Epistilbite

Where the product of the invention has an epistilbite topology the zeolite may have a composition expressed by the formula (in terms of mole ratios) of nXO:mY$_2$O:Al$_2$O$_3$:5–7 SiO$_2$:zH$_2$O wherein X is Ca, Y is an alkali metal cation, 0<n≦1, 0≦m, n>m and n+m is approximately 1 and z≧0. The zeolite produced is referred to hereafter as epistilbite.

EXAMPLE 15

0.20 grams of Ca-P1 was reacted with 10 mls of a solution of 1N CaCl$_2$ and 0.0009N NaOH for sixteen days at 240° C. Epistilbite was produced.

5. Synthesis of Mordenite and Analcime

Where the dominant cation of the reaction mixture is sodium and the pH range is from about 11–14, P1 will be converted to analcime and/or mordenite. A temperature range of from about 150° C. to 275° C. is used and the zeolite is formed in about two hours or more.

That is, the invention further includes a method of making a zeolite, comprising the steps of forming an aqueous mixture including a P1 zeolite, said mixture comprising at least one alkali metal cation, such as sodium; and heating the mixture to produce a zeolite which has the mordenite (MOR) and/or analcime (ANA) topology and includes the alkali metal cation.

The new materials of the invention are expected to have uses, like their naturally occurring counterparts and other zeolites, wherever molecular sieves find application, e.g. in gas separation and hydrocarbon and other chemical conversions.

While the present invention is disclosed by reference to the preferred embodiments set forth above, it is to be understood that these are intended in an illustrative only. For example, based on the disclosures here relating to alkaline earth and alkali metal containing zeolites (and their preparation), modifications will readily occur to those skilled in the art. Such modifications which relate to these methods are new zeolites are considered to be within the spirit of the invention and within the scope of the appended claims.

What is claimed is:

1. A method of making a zeolite, comprising the steps of forming a mixture of a P1 zeolite in aqueous solution, said solution comprising at least one alkaline earth cation; and heating said mixture to produce a zeolite that is different from P1 but includes said alkaline earth cation.

2. A method according to claim 1, wherein said P1 zeolite has a silicon to aluminum ratio of greater than or equal to about 3.

3. A method according to claim 1, wherein said zeolite product is a member selected from the group consisting of heulandite, brewsterite, epistilbite, and harmotome.

4. A method according to claim 1, including the further step of adding seeds of a zeolite to said mixture.

5. A method according to claim 1, wherein said heating step is carried out at a temperature from about 100° C. to about 300° C.

6. A method according to claim 1, wherein said heating is carried out for a period of greater than about 1 day.

7. A method according to claim 1, wherein said alkaline earth cation is a member selected from the group consisting of calcium, strontium and barium.

8. A method according to claim 7, wherein said alkaline earth cation is calcium and said heating step is carried out at a temperature from about 200° C. to about 280° C. for a period from about 7 days to about 24 days.

9. A method according to claim 7, wherein said alkaline earth cation is strontium and said heating step is carried out at a temperature from about 200° C. to 240° C. for a period of greater than about 1 day.

10. A method according to claim 7, wherein said alkaline earth cation is barium and said heating step is carried out at a temperature of about 240° C. for a period of greater than about 7 days.

11. A method according to claim 1, wherein said solution further comprises an alkali metal cation.

12. A method of making a zeolite having a heulandite topology, comprising the steps of forming an aqueous mixture of an alkaline earth cation and adding a P1 zeolite thereto; and heating said mixture for a period of time to produce said zeolite having a heulandite topology and a molar composition in terms of mole ratios expressed by the formula nXO:mY$_2$O:Al$_2$O$_3$:6–8 SiO$_2$:zH$_2$O, wherein X is at least one alkaline earth cation selected from the group consisting of Ca and Sr, Y is an alkali metal cation, 0<n≦1, 0≦m, n>m, n+m is approximately 1, and z≧0.

13. A method according to claim 12, wherein X is Sr.

14. A method according to claim 12, wherein said mixture is heated to a temperature from about 100° C. and about 300° C.

15. A method according to claim 12, further comprising the step of adding seeds of a zeolite to said mixture.

16. A method according to claim 15, wherein X is Ca.

17. A method according to claim 12, wherein said P1 zeolite has a silicon to aluminum ratio of about 3 or greater.

18. A method according to claim 13, wherein said P1 zeolite has a silicon to aluminum ratio of about 3.3 or greater.

19. A method according to claim 13, wherein said mixture further comprises a hydroxide.

20. A method according to claim 13, wherein said period is greater than eight days.

21. A method according to claim 13, wherein the pH of said solution is alkaline and about 12 or less.

22. A method according to claim 13, comprising the further step of exchanging said P1 with an alkaline earth cation prior to said forming step.

23. A method of making a zeolite having a brewsterite topology, comprising the steps of:
forming an aqueous mixture of an alkaline earth cation, a P1 zeolite and seeds to form a mixture, wherein said seeds include a zeolite having a brewsterite topology; and heating said mixture for a period of time to produce said zeolite having a brewsterite topology and a molar composition expressed in terms of mole ratios by the formula $nXO:mY_2O:Al_2O_3:5.5–6.5\ SiO_2:zH_2O$, wherein X is at least one alkaline earth cation selected from the group consisting of Sr and Ca, Y is an alkali metal cation, $0<n\leq 1$, $0\leq m$, $n>m$, $n+m$ is approximately 1, $z\geq 0$ and wherein the amount of $Ca\geq 0$ and the amount of Sr is greater than the amount of Ca.

24. A method according to claim 23, wherein said P1 zeolite has a silicon to aluminum ratio of at least 3 or greater.

25. A method according to claim 23, wherein said P1 zeolite has a silicon to aluminum ratio of at least 3.2 or greater.

26. A method according to claim 23, wherein X is Sr.

27. A method according to claim 23, wherein said mixture is heated to a temperature from about 200° C. to about 240° C.

28. A method according to claim 23, wherein the pH of said solution is alkaline and is about 12 or less.

29. A method according to claim 23, wherein said mixture further comprises a hydroxide.

30. A method according to claim 23, wherein said period is greater than about 1 day.

31. A method according to claim 23, comprising the further step of exchanging said P1 with an alkaline earth cation prior to said forming step.

32. A method of making a zeolite having a phillipsite topology, comprising the steps of forming an aqueous mixture of barium and a P1 zeolite; and heating said mixture for a period of time to form said zeolite having a phillipsite topology and a molar composition expressed in terms of mole ratios by the formula $nXO:mY_2O:Al_2O_3:4–6\ SiO_2:zH_2O$, wherein X is at least one alkaline earth cation selected from the group consisting of Ba and Ca, Y is an alkali metal cation, $0<n\leq 1$, $0\leq m$, $n>m$, $n+m$ is approximately 1, $z\geq 0$ and wherein $Ca\geq 0$ and the amount of Ba is greater than the amount of Ca.

33. A method according to claim 32, wherein said P1 zeolite has a silicon to aluminum ratio of about 3 or greater.

34. A method according to claim 32, wherein said mixture is heated to a temperature from about 200° C. to about 275° C.

35. A method according to claim 32, wherein the pH of said solution is alkaline and about 12 or less.

36. A method according to claim 32, comprising the further step of exchanging said P1 with an alkaline earth cation prior to said forming step.

37. A method of making a zeolite having an epistilbite topology, comprising the steps of forming an aqueous mixture of a P1 zeolite, $Ca^{2+}$ and an alkali metal cation; and heating said mixture for a period of time to form said zeolite and a molar composition expressed in terms of mole ratios by the formula $nXO:mY_2O:Al_2O_3:5–7\ SiO_2:zH_2O$, wherein X is Ca, Y is an alkali metal cation, $0<n\leq 1$, $0\leq m$, $n>m$ and $n+m$ is approximately 1 and $z\geq 0$.

38. A method according to claim 37, wherein said P1 zeolite has a silicon to aluminum ratio of about 3 or greater.

39. A method according to claim 37, wherein said P1 zeolite has a silicon to aluminum ratio of about 3.2 or greater.

40. A method according to claim 37, further comprising the step of adding seeds of a zeolite to said mixture.

41. A method according to claim 37, wherein said mixture is heated to a temperature of from about 150° C. to about 240° C.

42. A method according to claim 37, comprising the further step of exchanging said P1 with an alkaline earth cation prior to said forming step.

43. A method of making P1 zeolite, comprising the steps of forming a sodium aluminosilicate gel from an aqueous mixture including silica and alumina at a basic pH; drying said gel to form a dried solid, said dried solid having a composition expressed by the formula in terms of molar ratios of $1–4\ Na_2O:Al_2O_3:9–10\ SiO_2$; and mixing said dried solid with an aqueous solution of $Na_2CO_3$ to form said P1 zeolite having a silicon to aluminum ratio of about 3 or greater.

44. A method according to claim 43, wherein said silica is a fumed silica.

45. A method according to claim 44, wherein said heating step is carried out at a temperature of from about 110° C. to about 175° C.

46. A method according to claim 43, wherein said silica is a colloidal silica.

47. A method according to claim 46, wherein said heating step is carried out at a temperature of about 150° C.

48. A method for making P1 zeolite, comprising:
heating an aqueous mixture containing perlite and an alkali metal cation in a basic environment to form said P1 zeolite having a silicon to aluminum ratio of 3 or greater.

49. A method according to claim 48, wherein said P1 zeolite has a silicon to aluminum ratio of 3.2 or greater.

50. A method according to claim 48, wherein said heating step is carried out at a temperature of from about 110° C. to about 240° C.

51. A method according to claim 48, wherein said P1 zeolite is formed in a period of time from about 2 hours to about 11 days.

52. A method of making P1 zeolite, comprising the steps of forming an aqueous mixture of $Al(OH)_3$ and NaOH; adding colloidal silica to said aqueous mixture to form a gel precursor; stirring said gel precursor to form a gel; heating said gel at about 110° C.–175° C. to produce said P1 zeolite, wherein said gel precursor has a composition such that said P1 zeolite has a silicon to aluminum ratio of about 3 or greater.

53. A method according to claim 52, wherein said P1 zeolite has a silicon to aluminum ratio of about 3.2 or greater.

54. A method according to claim 52, wherein said P1 zeolite is heated at about 150° C. for a period of time from about 2 days to about 7 days.

55. A method according to claim 53, wherein the pH of said mixture is about 12–13.

56. A method of making a zeolite, comprising the steps of: forming a mixture of a P1 zeolite in aqueous mixture, said mixture comprising at least one alkali metal cation; and heating said mixture to produce a zeolite that is different from P1 but includes said alkali metal cation.

57. A method according to claim 56, wherein said zeolite product is a member selected from the group consisting of analcime and mordenite.

* * * * *